United States Patent
Korhonen et al.

(10) Patent No.: US 6,830,179 B2
(45) Date of Patent: Dec. 14, 2004

(54) PAYMENT SYSTEM

(75) Inventors: Aki T. Korhonen, Helsinki (FI); Markus Martin, Helsinki (FI)

(73) Assignee: Nokia Corporation, Espoo (FI)

(*) Notice: Subject to any disclaimer, the term of this patent is extended or adjusted under 35 U.S.C. 154(b) by 6 days.

(21) Appl. No.: 10/204,057

(22) PCT Filed: Dec. 13, 2001

(86) PCT No.: PCT/FI01/01091

§ 371 (c)(1), (2), (4) Date: Aug. 16, 2002

(87) PCT Pub. No.: WO02/50727

PCT Pub. Date: Jun. 27, 2002

(65) Prior Publication Data

US 2003/0057273 A1 Mar. 27, 2003

(30) Foreign Application Priority Data

Dec. 20, 2000 (FI) .............................................. 20002804

(51) Int. Cl.⁷ .............................................. G06K 15/00
(52) U.S. Cl. ....................... 235/383; 235/378; 235/380; 235/375
(58) Field of Search ........................ 235/383, 375–376, 235/378, 380, 472.01, 487, 379, 381; 705/1, 17, 64; 467/408, 406

(56) References Cited

U.S. PATENT DOCUMENTS

| | | | |
|---|---|---|---|
| 5,878,141 A | * 3/1999 | Daly et al. ..................... 705/78 |
| 6,131,024 A | 10/2000 | Boltz | |
| 6,144,848 A | * 11/2000 | Walsh et al. ................. 455/419 |
| 6,178,407 B1 | * 1/2001 | Lotvin et al. ................. 705/14 |
| 6,516,190 B1 | * 2/2003 | Linkola ...................... 455/408 |
| 6,641,037 B2 | * 11/2003 | Williams ..................... 235/383 |
| 2001/0005832 A1 | * 6/2001 | Cofta .......................... 705/17 |
| 2002/0017561 A1 | * 2/2002 | Tomoike ..................... 235/383 |

FOREIGN PATENT DOCUMENTS

| | | |
|---|---|---|
| EP | 848 560 | 6/1998 |
| WO | WO 94/11849 | 5/1994 |
| WO | WO 96/13814 | 5/1996 |
| WO | WO 00/004702 | 1/2000 |
| WO | WO 00/40052 | 7/2000 |

* cited by examiner

*Primary Examiner*—Thien M. Le
*Assistant Examiner*—Edwyn Labaze
(74) *Attorney, Agent, or Firm*—Pillsbury Winthrop LLP

(57) ABSTRACT

The present invention relates to a payment system comprising a terminal (26) for establishing a connection via a mobile communication network to purchase chargeable services or products, a service provider's payment centre (25) for receiving information on the payment of services or products purchased by a subscriber, and a billing centre (24) for maintaining subscriber-specific billing data comprising information, required for billing, on the services or products purchased. The payment system further comprises means (23) for comparing the price of a selected service or product with a limit of a corresponding defined service or product group, and means (23) for accepting the purchase of the service or product provided the price of the service or product is below or equal to the limit of the corresponding group or rejecting the purchase if the price of the service or product exceeds the limit.

4 Claims, 3 Drawing Sheets

PAYMENT SYSTEM

This application is the National Phase of International Application PCT/FI01/01091 filed Dec. 13, 2001 which designated the U.S. and that International Application was published under PCT Article 21(2) in English.

BACKGROUND OF THE INVENTION

The invention relates to mobile communication networks and particularly to purchasing chargeable services or products via them.

Solutions are presently known in which a mobile station is used to pay for different services and products, such as car wash or soft drinks purchased from slot machines. These types of solutions are likely to become common in the future.

It is previously known to prevent a subscriber from using certain types of services. This means that a given subscriber line is not permitted long distance calls or calls to given service numbers, for example. It is also previously known to limit the use of a mobile subscription by defining a maximum allowed upper limit for a billing period. Prepaid type of billing also provides opportunities for customizing and limiting the use of mobile subscriptions.

The problem in the above arrangements is the inability to control the use of the different services so as to allow the use of different types of services or products up to a defined limit depending on the type of product or service. Parents, for example, may want to control their children's mobile telephone bills by limiting the use of some services by certain conditions, while other services are entirely allowed or entirely inhibited. An employer may also wish to limit the purchases of different product or service types in company mobile telephones used by employees.

BRIEF DESCRIPTION OF THE INVENTION

The object of the invention is thus to provide a method and an apparatus for implementing the method so as to solve the above problems. The object of the invention is achieved by a method and system that are characterized by what is stated in the independent claims. The preferred embodiments of the invention are disclosed in the dependent claims.

The invention is based on defining groups of products and services to be purchased via a mobile communication network, and defining group-specific limits of use. When a subscriber selects a product or service for purchase, a check is made to see if the limit of the corresponding service or product group allows said purchase. A group may comprise one or more services and/or products, and a service or product may belong to one or more groups.

The advantage of the method and system of the invention is the ability to control the purchases of different services or products via a mobile communication network more accurately than previously. This means that the purchases of services and products do not have to be entirely allowed or inhibited; instead, group-specific limits are used. This advantage is particularly emphasized when the user of a subscriber line is not the owner of the line or the payer of the bills.

BRIEF DESCRIPTION OF THE DRAWINGS

In the following the invention will be described in greater detail by means of preferred embodiments with reference to the attached drawings, in which

FIG. 1 is a flow diagram of a method of the invention. In step 1A, different groups of services and/or products are defined. A group may comprise one or more services and/or products, and a service or product may belong to one or more groups. For example service providers, together with a network operator, may carry out this step. In this case an operator offers the limitation service to subscribers. In step 1B, subscriber-specific limits, i.e. the highest allowed amounts of money to be used, are defined for each group. This step may be carried out in advance as a contract between an owner of the subscription and the network operator and/or service provider. Limits can also be defined for a larger group of subscribers at a time, e.g. for a certain VPN (Virtual Private Network) group. The owner of the subscription can define service or product groups and limits for those groups through different kinds of user interfaces, e.g. WAP (Wireless Application Protocol), SMS (Short Message Service), IVR (Interactive Voice Response) or www (World Wide Web) interfaces. Herein, groups allowed to a subscriber are selected and a given amount of money is defined as the limit for the groups, and groups to be inhibited are selected and their limits are set to zero. A limit may be defined to indicate the largest allowed available amount of money for a billing period or for some other period defined. Once said period has lapsed, the original limit is again set as the limit for that group, unless otherwise agreed. Alternatively, a new desired limit can be set for example after the bill has been paid. Even if the user has not used the credit set for some specific service, a new limit can be set. In step 1C, the service or product to be purchased is selected. In step 1D, a connection is established via a mobile communication network e.g. by calling a service number or by means of a short message or the WAP technology. If required, this step can include subscriber identification by means of a password, for example. The system is notified of the product or service selected. In step 1E, the system identifies the group the product or service belongs to. In step 1F, the price of the product or service is compared with the limit of the corresponding group. In step 1G, the purchase is accepted provided its price is below or equal to the limit. Otherwise the purchase is rejected and this may be notified to the subscriber. In step 1H, information on an accepted purchase is transmitted to the service provider. In step 1l, information on an accepted purchase is transmitted to the billing centre. Steps 1H and 1l may be executed simultaneously. In steps 1H and 1l, e-mail, short messages or other messaging may be used. The subscriber may be charged for the prices of the purchases stored in subscriber-specific billing data in a mobile telephone bill, for example, this being subject to the network operator and the service provider having a contract under the terms of which the service provider charges the operator for the prices of products or services sold. The billing centre may also be independent of a mobile communication network, whereby billing data are collected to the billing centre and the subscriber pays for the purchases according to the billing data collected. However, billing methods may vary and are not within the scope of the present invention. In step 1J, the price of an accepted purchase is subtracted from the limit of the corresponding group and, in step 1K, the result of said subtraction is stored as the new limit of said group.

As distinct from the above example, it is also feasible that at least some product or service groups act on a prepaid basis. However, the present invention does not cover the way a subscriber is billed or the billing relationship between a service provider and an operator.

Figure 1:
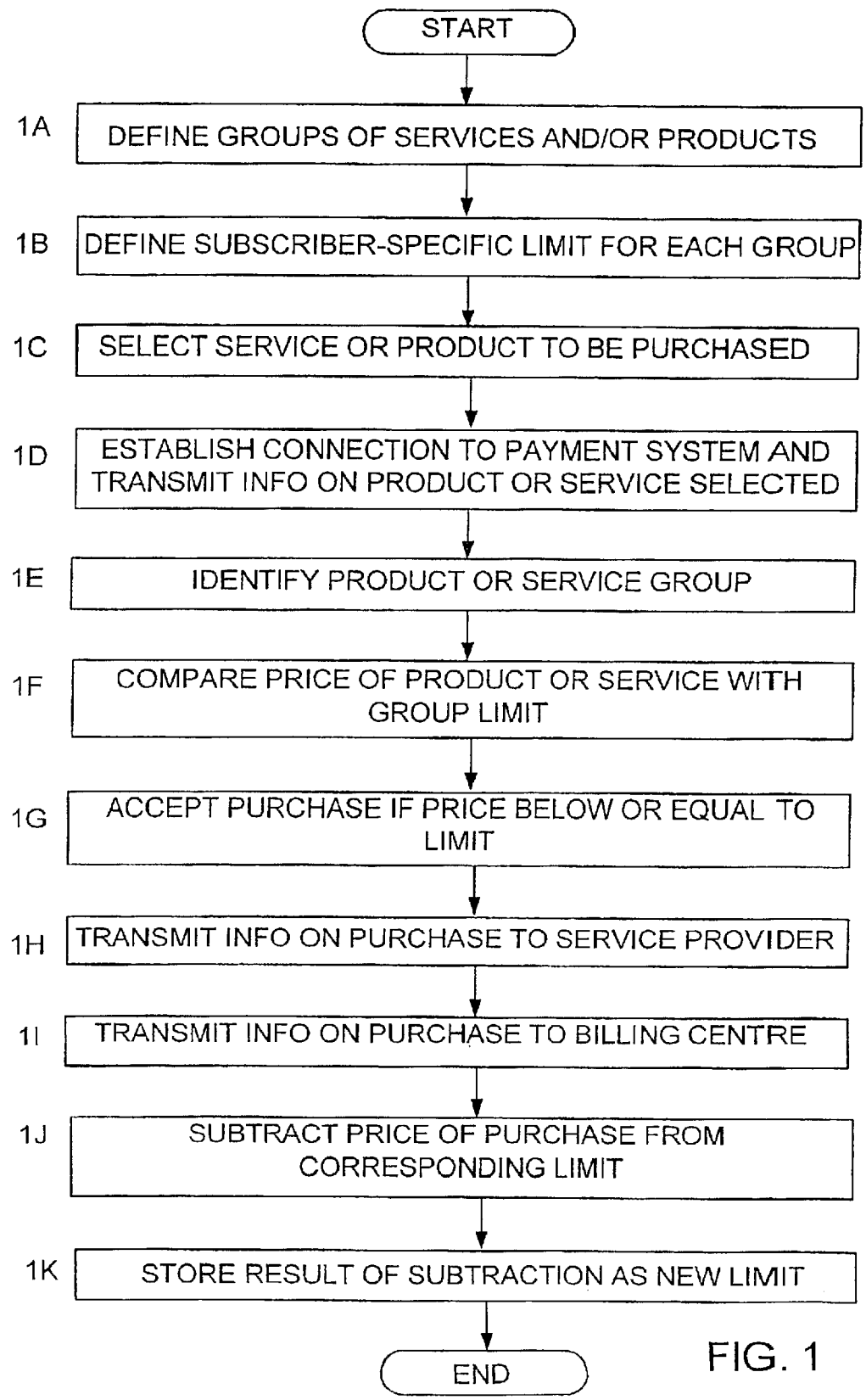
FIG. 1 is a flow diagram of a method of the invention.
Figure 2:
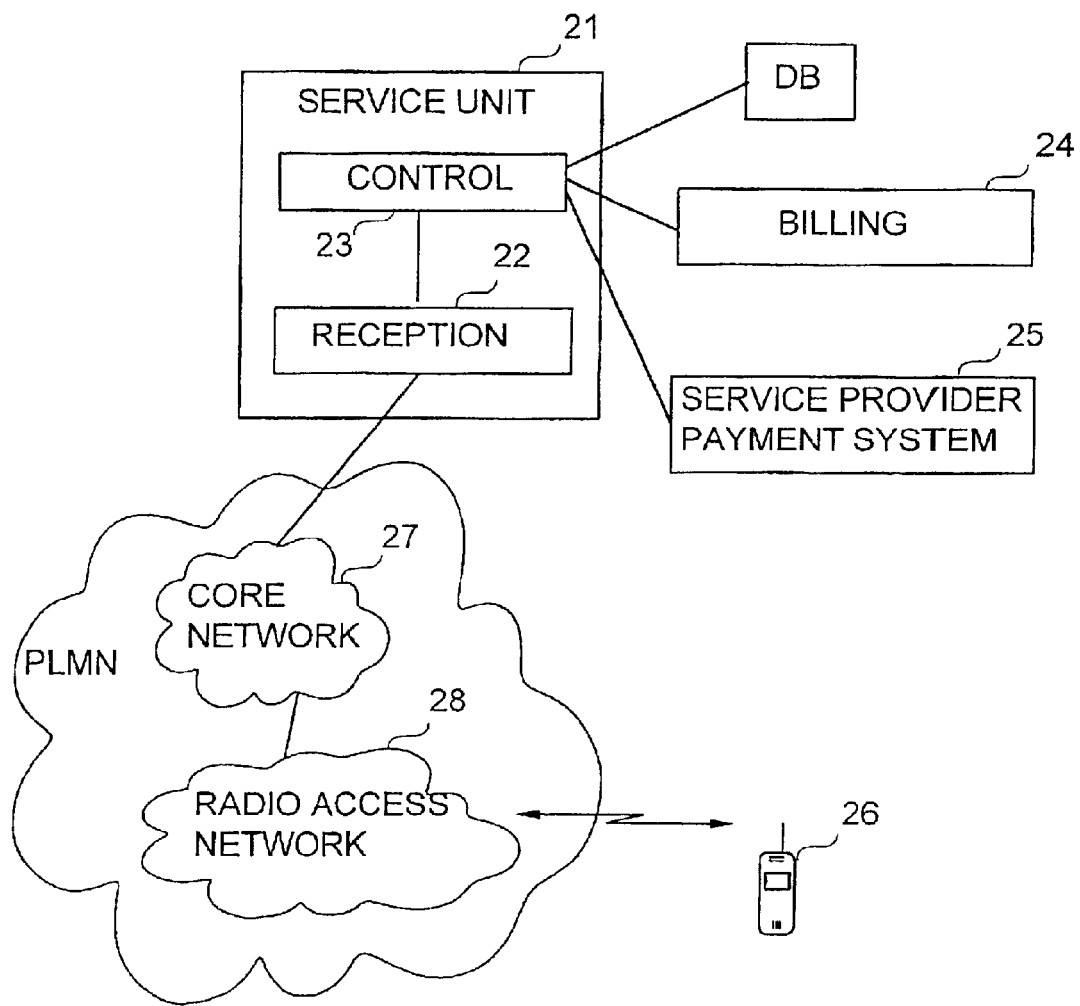
FIG. 2 is a block diagram of a system of the invention.

FIG. 2 is a block diagram of a system of the invention. The figure only shows the elements relevant to understanding the invention. The system of the figure comprises a terminal 26, a public land mobile network (PLMN), a radio access network 28, a core network 27, where a switching entity for establishing a connection is located, a service unit 21 for implementing the limitation service according to the invention, and a database DB in data transmission connection with the service unit 21, a billing centre 24 and the service provider's payment centre 25. To facilitate understanding the invention, the service unit 21 is divided into a reception block 22 and a control block 23. In practice, the service unit may be composed of computer software and/or circuits or it can be implemented by means of intelligent network elements. The invention can be implemented in different kinds of networks, for example in GSM (Global System for Mobile Communications) or in UMTS (Universal Mobile Telecommunication System).

Let us assume that the operator has defined groups of products and services in advance, and the subscriber has agreed with the operator on his group-specific limits. These subscriber-specific limit data are stored in the database DB. When the subscriber selects a product or service for purchase, he establishes a connection from the terminal 26 to the service unit 21. The reception block 22 of the service unit 21 then receives information on the product or service selected by the subscriber. The control block 23 identifies the group to which the product or service belongs, retrieves from the database DB said subscriber's limit for said group and compares the price of the product or service with said limit. If the purchase is acceptable, the control block 23 transmits information on the accepted purchase to the network's billing centre 24 and subtracts the price of the purchase from the limit of said group. The amount of money obtained as the result of the subtraction is stored in the database DB as the new limit of the group. Information on the accepted purchase is also transmitted to the service provider's payment centre 25. This may be carried by e-mail or short messages, for example.

Figure 3:
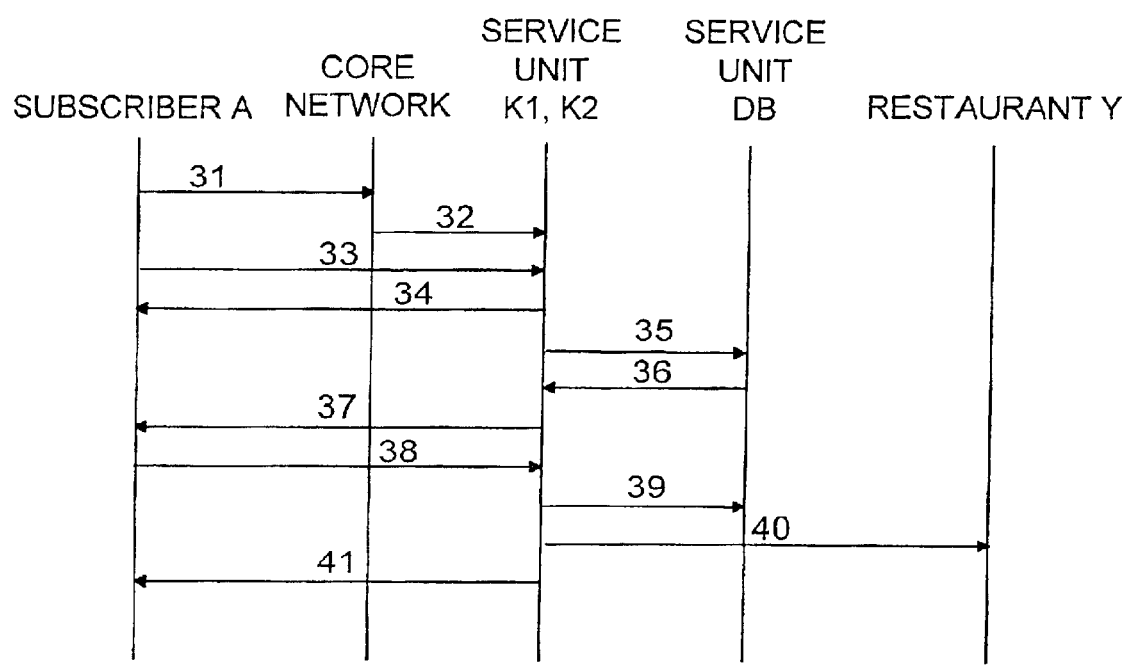
FIG. 3 is a signalling diagram of the steps of the method according to the invention.

FIG. 3 is a signalling diagram of the steps of the method of the invention. Let us assume by way of example that subscriber A has the following group profile: FIM 1,500 monthly for purchases of services from group R1, and FIM 100 monthly for purchases of services from group R2. At the present moment, no services of either group have been purchased during the current month. In addition, password 1234 has been defined for the subscriber for the services. Restaurant Y has agreed with an operator that products supplied by the restaurant are payable by means of a mobile station. Restaurant bills belong to group R1. For restaurant Y, the operator has defined a service number XXXX, which a subscriber calls to pay his bill. The following describes the payment process.

Subscriber A wishes to pay a restaurant bill amounting to FIM 152 by a mobile station. He then calls or sends a service request to the network. The request is directed by number XXXX in step 31. From the network the request is routed to the service unit in step 32, in which service unit a service program K1 is started. In step 33, the service program requests subscriber A to enter the service password. In step 34, subscriber A keys in to the mobile station password 1234, which is conveyed as DTMF (Dual Tone Multi-Frequency) signalling to the service unit. Next, in step 35, the service program K1 uses the subscriber number to retrieve from a database, located in the same or a separate network element, said subscriber's service group profile. The program carrying out database retrievals returns the service group profile in step 36 provided the password entered together with the subscriber number is correct. Next the service program K1 calls a service program K2, which checks if a purchase of said service is allowed. Since in this case it is so, in step 37 the service program inquires of subscriber A the price to be paid. In step 38, subscriber A informs the price, which in this example is FIM 152. The service program K2 then checks if the limit allows said purchase. Since FIM 1,500 remain to be used, and the bill amounts to FIM 152, the service program K2 accepts the purchase of the service. In step 39, the service program K2 updates the database with the data of the event, i.e. the remaining sum of money, FIM 1,348, becomes the group limit. In step 40, the service program sends an acknowledgement of the payment of the bill to the payment terminal of restaurant Y as a short message, for example. In step 41, the service program requests that the system notify subscriber A that the payment was made. Finally, the service program sends to subscriber A an acknowledgement in the form of a short message, for example, stating that a payment of FIM 152 has been made to restaurant Y and the remaining limit of group R1 is FIM 1,348.

If the above bill had concerned service group R2, the service program K2 would have rejected the payment and sent notification thereof to restaurant Y and subscriber A.

As distinct from the above example, it is also feasible that a company offers several services belonging to different groups. In this case the services could have associated with them service identifiers, with which the operator would identify the service. An alternative is to define different service numbers for different services.

It is obvious to a person skilled in the art that, as technology advances, the inventive concept can be implemented in a variety of ways. Thus the invention and its embodiments are not limited to the above examples but may vary within the scope of the claims.

What is claimed is:

1. A payment system comprising
   a terminal for establishing a connection via a mobile communication network to purchase chargeable services or products,
   a service provider's payment centre for receiving information on the payment of services or products purchased by a subscriber, and
   a billing centre for maintaining subscriber-specific billing data comprising information, required for billing, on the services or products purchased,
   a register for maintaining information of a subscriber specific limit for each of a plurality of services or product groups, the subscriber specific limit of a group defining the maximum value of purchases for the subscriber of services or products belonging to the group in question,
   means for comparing the price of a selected service or product, which said subscriber has selected for purchase, with the information stored in said register in order to determine if the price of the selected service or product exceeds the subscriber specific limit for said subscriber for services or products belonging to the same group as said selected service or product, and
   means for accepting the purchase of the service or product which said subscriber has selected for purchase, provided the price of the service or product is below or equal to said subscriber specific limit for said subscriber for services or products belonging to the same groups as said selected product, or for rejecting the purchase if the price of the selected service or product exceeds said limit.

2. The payment system as claimed in claim 1, wherein the payment system further comprises
- means for receiving information on the services or products selected for purchase by a subscriber,
- means for identifying said selected service or product group on the basis of the received information,
- means for transmitting the information on the accepted purchase to the service provider's payment centre,
- means for transmitting the information on the accepted purchase to the billing centre, and
- means for subtracting an amount of money corresponding to the accepted purchase from the limit of said service or product group.

3. A method of processing purchases of chargeable services or products via a mobile communication network, comprising:
- defining a plurality of groups of services and/or products for a subscriber,
- defining a subscriber-specific maximum limit for each one of said plurality of service or product groups, the subscriber specific limit of a group defining the maximum value of purchases for the subscriber of services or products belonging to the group in question,
- when selecting a service or product for purchasing via said mobile communication network, comparing the price of the selected service or product with the subscriber specific limit for the service or product group in question in order to determine if the price of the selected service or product exceeds the subscriber specific limit for said subscriber for services or products belonging to the same group as said selected service or product, and
- accepting the purchase if the price of the selected service or product is below or equal to the defined limit for said subscriber for services or products belonging to the same group as said selected product, or rejecting the purchase if the price of the selected service or product exceeds said limit.

4. The method as claimed in claim 3, wherein said purchasing of a service or product further comprises
- establishing a connection from a terminal to a payment system and transmitting information on the service or product selected,
- identifying in the payment system the group the product or service belongs to,
- comparing the price of the service or product with the limit for the service or produce group in question,
- accepting the purchase of the service or product provided the price of the selected service or product is below or equal to the limit for said subscriber for services or products belonging to the same group as said selected product,
- transmitting information on the accepted purchase to a service provider's payment centre,
- transmitting information on the accepted purchase to a billing centre,
- subtracting a sum of money corresponding to the accepted purchase from the limit of said service or product group, and
- setting the result of said subtraction as the new limit of said service or product group.

* * * * *